(12) United States Patent
Yillan et al.

(10) Patent No.: US 9,902,527 B2
(45) Date of Patent: Feb. 27, 2018

(54) COATED FABRIC, A BAG PRODUCED THEREFROM, A PACKAGING MACHINE FOR BAGS AND A METHOD FOR FILLING THE BAGS

(75) Inventors: Maria Isabel Arroyo Yillan, Tarragona (ES); Thomas Schütte, Lippstadt (DE); Franz Schneider, Bad Fischau-Brunn (AT)

(73) Assignees: DOW CHEMICAL IBERICA S.L., Madrid (ES); HAVER & BOECKER OHG, Oelde (DE); STARLINGER & CO GESELLSCHAFT M.B.H., Vienna (AT)

( * ) Notice: Subject to any disclaimer, the term of this patent is extended or adjusted under 35 U.S.C. 154(b) by 836 days.

(21) Appl. No.: 13/879,490

(22) PCT Filed: Oct. 18, 2011

(86) PCT No.: PCT/EP2011/068198
§ 371 (c)(1),
(2), (4) Date: Jul. 31, 2013

(87) PCT Pub. No.: WO2012/052445
PCT Pub. Date: Apr. 26, 2012

(65) Prior Publication Data
US 2013/0305664 A1    Nov. 21, 2013

Related U.S. Application Data

(60) Provisional application No. 61/394,816, filed on Oct. 20, 2010.

(51) Int. Cl.
*B65D 30/08* (2006.01)
*B65B 51/30* (2006.01)
(Continued)

(52) U.S. Cl.
CPC .............. *B65D 29/02* (2013.01); *B29C 65/02* (2013.01); *B29C 65/224* (2013.01);
(Continued)

(58) Field of Classification Search
CPC .......... B65D 29/02; B65B 51/30; C09J 7/043; B29C 65/02; B29C 65/224;
(Continued)

(56) References Cited

U.S. PATENT DOCUMENTS

| 3,645,992 A | 2/1972 | Elston |
| 4,076,698 A | 2/1978 | Anderson et al. |

(Continued)

FOREIGN PATENT DOCUMENTS

| DE | 4318415 | 12/1994 |
| EP | 0283201 | 9/1988 |

(Continued)

OTHER PUBLICATIONS

PCT/EP2011/068198, dated Apr. 3, 2012, International Search Report.

*Primary Examiner* — Jeremy R Pierce
(74) *Attorney, Agent, or Firm* — Workman Nydegger

(57) ABSTRACT

A coated fabric (11), comprising a fabric (12) from polymer tapes (12*a*, 12*b*), wherein the fabric (12) is coated with a sealing layer (13), wherein • at least a portion of the polymer tapes (12*a*, 12*b*) have a breaking tenacity of less than 45 cN/tex, preferably 15 to 40 cN/tex and an elongation at break of more than 30%, preferably of 40 to 90%, and/or • wherein the sealing layer (13) is formed from a composition A comprising at least one ethylene/α-olefin interpolymer, and wherein the composition has a density from 0.905 to 0.930 g/cc, preferably from 0.910 to 0.930 g/cc (1 cc=1 cm$^3$), and a melt index (12) from 3 to 20 g/10 min and a bag comprising said fabric; a packaging machine (100) for filling (Continued)

gusseted (220) bags (10, 200) wherein the bag walls (202) of the bags (10, 200) consist of a woven fabric (11) of polymer tapes (12a, 12b) at least in part and wherein each of the ends (203, 204) of the bag wall (202) is provided with a filling mouth (211) for filling, wherein a closing device (125) is provided which is structured such that as the filling mouth (211) is closed a welding temperature of at least 50 Kelvin higher in the region of the gussets (220) than in a center region (223) of the bag wall (202) can be generated.

24 Claims, 6 Drawing Sheets

(51) Int. Cl.

| | | |
|---|---|---|
| C09J 7/04 | (2006.01) | |
| B29C 65/02 | (2006.01) | |
| B29C 65/22 | (2006.01) | |
| B29C 65/74 | (2006.01) | |
| B29C 65/00 | (2006.01) | |
| B32B 27/12 | (2006.01) | |
| B32B 27/32 | (2006.01) | |
| B65B 9/20 | (2012.01) | |
| B65D 75/12 | (2006.01) | |
| D06N 3/00 | (2006.01) | |
| D06N 3/04 | (2006.01) | |
| B29C 65/08 | (2006.01) | |
| B29C 65/14 | (2006.01) | |
| B29C 65/16 | (2006.01) | |
| B29C 65/18 | (2006.01) | |
| B29C 65/82 | (2006.01) | |

(52) U.S. Cl.
CPC ........ *B29C 65/226* (2013.01); *B29C 65/7451* (2013.01); *B29C 66/1122* (2013.01); *B29C 66/3452* (2013.01); *B29C 66/3462* (2013.01); *B29C 66/3472* (2013.01); *B29C 66/43* (2013.01); *B29C 66/431* (2013.01); *B29C 66/4312* (2013.01); *B29C 66/4322* (2013.01); *B29C 66/43121* (2013.01); *B29C 66/7234* (2013.01); *B29C 66/7292* (2013.01); *B29C 66/73712* (2013.01); *B29C 66/81261* (2013.01); *B29C 66/81417* (2013.01); *B29C 66/8221* (2013.01); *B29C 66/83241* (2013.01); *B29C 66/849* (2013.01); *B29C 66/919* (2013.01); *B29C 66/9192* (2013.01); *B29C 66/91411* (2013.01); *B29C 66/91935* (2013.01); *B32B 27/12* (2013.01); *B32B 27/32* (2013.01); *B65B 9/2056* (2013.01); *B65B 51/30* (2013.01); *B65B 51/303* (2013.01); *B65D 75/12* (2013.01); *C09J 7/043* (2013.01); *D06N 3/0002* (2013.01); *D06N 3/045* (2013.01); *B29C 65/08* (2013.01); *B29C 65/1412* (2013.01); *B29C 65/1425* (2013.01); *B29C 65/16* (2013.01); *B29C 65/18* (2013.01); *B29C 65/8215* (2013.01); *B29C 66/0042* (2013.01); *B29C 66/71* (2013.01); *B29C 66/73115* (2013.01); *B29C 66/91413* (2013.01); *B29C 66/91423* (2013.01); *B29C 66/929* (2013.01); *Y10T 442/2746* (2015.04)

(58) Field of Classification Search
CPC ............ B29C 65/7451; B29C 66/3452; B29C 66/3472; B29C 66/4312
See application file for complete search history.

(56) References Cited

U.S. PATENT DOCUMENTS

| | | | |
|---|---|---|---|
| 4,339,507 A | 7/1982 | Kurtz | |
| 4,649,259 A | 3/1987 | Zurn | |
| 5,071,699 A | 12/1991 | Pappas et al. | |
| 5,272,236 A | 12/1993 | Lai et al. | |
| 5,278,272 A | 1/1994 | Lai et al. | |
| 5,355,656 A | 10/1994 | Perrett | |
| 5,845,995 A | 12/1998 | Starlinger Huemer | |
| 6,054,544 A | 4/2000 | Finlayson et al. | |
| 6,335,410 B1 | 1/2002 | Finlayson et al. | |
| 6,723,810 B2 | 4/2004 | Finlayson et al. | |
| 2005/0187352 A1* | 8/2005 | Chum | C08L 23/0815 525/240 |
| 2007/0287798 A1* | 12/2007 | Lambert | C08L 23/06 525/53 |
| 2010/0209024 A1 | 8/2010 | Fuerst et al. | |
| 2010/0291344 A1* | 11/2010 | Arroyo-Villan | B32B 27/12 428/137 |
| 2011/0167763 A1 | 7/2011 | Waldherr | |

FOREIGN PATENT DOCUMENTS

| | | |
|---|---|---|
| EP | 0769585 | 4/1997 |
| EP | 2080615 | 7/2009 |
| GB | 1265755 | 3/1972 |
| JP | 10272746 | 10/1998 |
| JP | 10273848 | 10/1998 |
| JP | 2003053913 | 2/2003 |
| WO | WO 1995/030598 | 11/1995 |
| WO | WO 2009/033196 | 3/2009 |
| WO | WO 2010/031097 | 3/2010 |

* cited by examiner

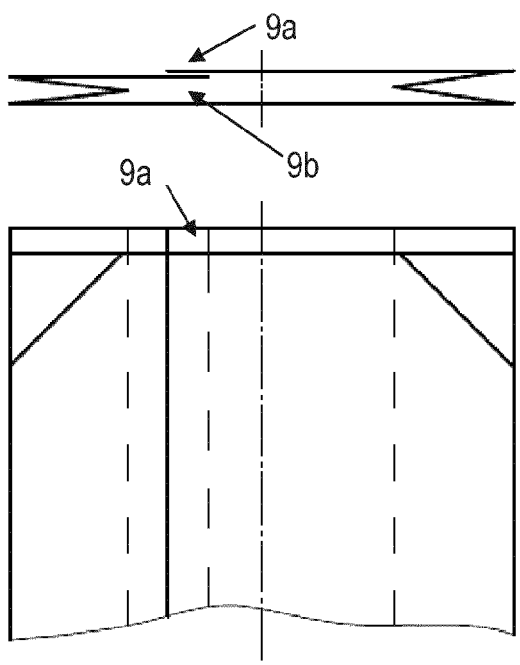
Fig. 5a
Fig. 5b
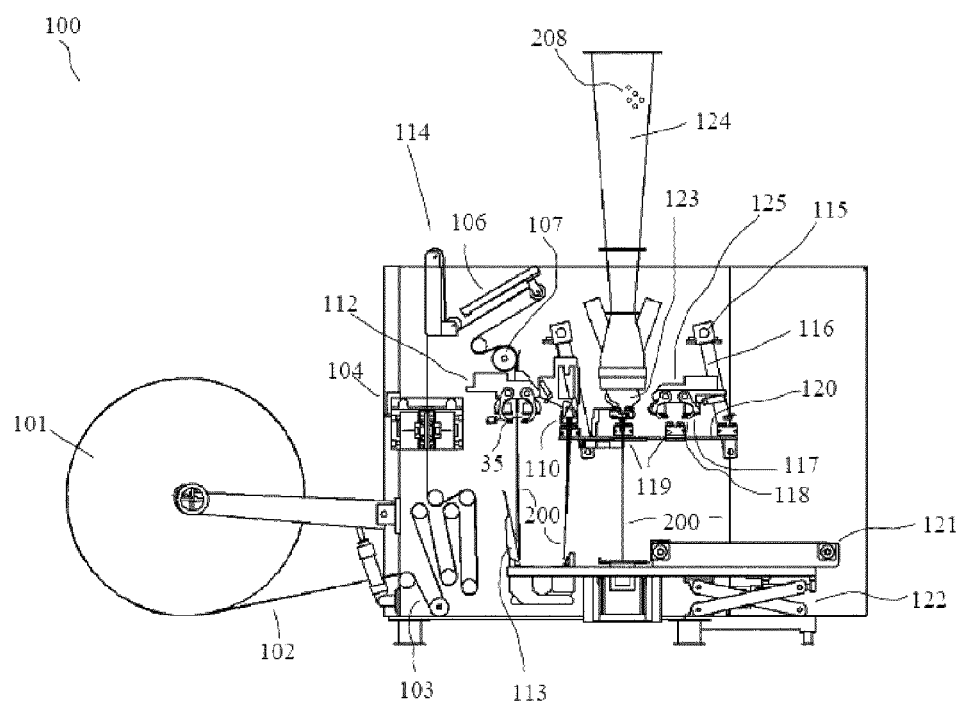
Fig. 6

COATED FABRIC, A BAG PRODUCED THEREFROM, A PACKAGING MACHINE FOR BAGS AND A METHOD FOR FILLING THE BAGS

CROSS REFERENCE TO RELATED APPLICATIONS

This application is a U.S. Nationalization of International Application Number PCT/EP2011/068198, filed on Oct. 18, 2011, which claims the benefit of and priority to U.S. Provisional Application No. 61/394,816, filed on Oct. 20, 2010, the entireties of which are incorporated herein by reference.

The invention relates to a coated fabric, comprising a fabric from polymer tapes, wherein the fabric is coated with a sealing layer. The invention further relates to a tubular bag body formed from a flat fabric bonded along the longitudinal edges to form a tube. The invention further relates to a bag comprising a tubular bag body formed from a flat fabric bonded along the longitudinal edges to form a tube, containing fabric of the mentioned art. The present invention finally relates to a packaging machine and a method for filling bags. The bags are manufactured in particular in the packaging machine itself or else in a device installed upstream of the packaging machine. For manufacturing the bags, tubular sheets are fed off a sheet roll and a specified length of tubular sheet is cut off and provided with a bottom seam before the bag is filled through the still open upper filling end. After the filling operation the filling end is closed tight. Packaging machines where the bag is formed, filled and then closed within the machine itself are also known as Form Fill Seal machines (FFS machines).

The tubular sheet used is often made of plastic which offers the advantage of high water impermeability. This is an advantage in particular in the case of moisture-sensitive products. The drawback of known bags is that if they drop down more than a certain height they may burst or the weld seam at the top end and/or the bottom seam at the lower end may tear and product may escape. Other than loss of the filled product this may cause considerable dust contamination of the ambience and may possibly even be a health hazard to humans.

Therefore, bags having higher tearing resistance have become known to prevent the bag walls from tearing open. These bags consist for example of a woven fabric of polymer tapes. Such bags have found multiple applications in the packaging industry, for example, for the production of packaging bags. Such packaging bags, which are shaped as box bags, are known, for example, from WO 95/30598 A1 and WO 2009/033196 A1. The fabrics therein consist of polymer tapes, wherein the fabric can be coated with a thermoplastic synthetic material. The fabric is either a tubular circular fabric produced on a circular loom or a flat fabric bonded to form a tube via a longitudinal weld or bonded seam.

These fabric bags are also referred to as woven plastic bags. For configuring the woven fabric to be dustproof and possibly water- and even airtight, the fabric may be provided with coating on the interior and/or exterior surface before manufacturing the tubular sheet since without any coating a dustproof or airtight seal cannot be ensured at each crossing of the yarns.

For better stackability these bags are made from gusseted tubular sheets. Before filling, these gussets are provided with corner seams so as to yield brick-shaped bags attractive in appearance. These corners also provide for better transportability as the person picking up the bag can use the corners as handles.

It has been found difficult to seal these bags made of woven polymer tapes. To improve weldability the interior surface of the tubular sheet is provided with a coating as described for instance in WO 2009/033196 A1 to facilitate manufacturing the weld seam. This allows welding the bags shut such that the contents are sealed in. The drawback is, however, that in the region of the gussets two exterior sides of the tubular sheet require welding as well. These are not provided with any coating increasing adhesion and facilitating welding such that in the gusset region the gussets may become detached from one another after welding. Although the bag will remain sealed tight, the brick shape will not be maintained such that stackability is poorer. These are considerable drawbacks in transport and sales.

If a filled bag produced by an FFS process is subjected to a drop test, the impact causes stress in the bag material which results in a peeling stress of the sealed seam. A high strength fabric thereby leads to high peel stress in the sealing seam before the energy can then be dissipated by stretching the fabric material. Seal seams that withstand these forces require a thick and expensive sealing layer.

One conceivable option for improving adhesion in the region of the gussets is to provide a suitable coating on the entire exterior surface of the tubular sheet as well. The drawback is, however, the considerably increased complexity.

It is therefore an object of the present invention to provide a coated fabric where the disadvantages of the prior art are reduced. In particular it is an object of the present invention to provide a coated fabric which enables sealing without thick and expensive sealing layers. It is a further object of the present invention to provide a packaging machine and a method for filling bags in which stackable bags are filled involving acceptable complexity.

These objects are solved by a coated fabric, comprising a fabric from polymer tapes, wherein the fabric is coated with a sealing layer, which is characterised in that at least a part of the polymer tapes has a breaking tenacity of less than 45 cN/tex, preferably 15 to 40 cN/tex and an elongation at break of more than 30%, preferably of 40 to 90%.

Surprisingly it has been found that a woven fabric which contains tapes with a high toughness and just sufficient breaking tenacity compared to conventional tapes leads to a dissipation of energy at a lower stress level and therefore a lower peeling stress on the sealing seam. The high elongation ensures a high level of energy dissipation.

The breaking tenacity (units: centinewton per tex; abbrev. cN/tex) and an elongation at break (units: %) are defined in International Standard ISO 2062:2009(E), third edition 2009 Dec. 1. The breaking tenacity is the ratio of a yarn's breaking force to its linear density. The term elongation at break (A) is defined as the elongation recorded at the moment of rupture of the specimen, often expressed as a percentage of the original length. It corresponds to the breaking or maximum load (see http://de.wikipedia.org/wiki/Bruchdehnung).

$$A = \frac{\Delta L}{L_0} \cdot 100\% = \frac{L_u - L_0}{L_0} \cdot 100\%$$

$L_0$ initial length
$L_u$ length after rupture

In a preferred embodiment the fabric contains warp tapes and weft tapes, wherein said warp tapes have said breaking tenacity of less than 45 cN/tex, preferably 15 to 40 cN/tex and an elongation at break of more than 30%, preferably of 40 to 90%. This finding takes into account that the emerging tensions are higher in weft direction than in the warp direction ("Barlow's formula") and that the sealing seams are at right angles to the warp direction and therefore are mainly loaded in warp direction. Accordingly, in an even more preferred embodiment the weft tapes are with traditional or conventional characteristics so at least a portion of the weft tapes have a breaking tenacity and/or an elongation at break different from said warp yarns. Yet, of course it is possible to also use weft tapes with said breaking tenacity and said elongation at break. Preferably, at least a portion of the weft tapes have a higher breaking tenacity (and/or lower elongation at break) as the warp tapes.

Polymer tapes with a breaking tenacity of less than 45 cN/tex, preferably 15 to 40 cN/tex and an elongation at break of more than 30%, preferably of 40 to 90% can be obtained from thermoplastic material, in particular from polyolefins such as PE or PP. The most preferred polymer tapes consist of HDPE or LLDPE.

In one embodiment, the polymer tape is formed from a PE. In a further embodiment, the PE is HDPE. In another embodiment, the PE is LLDPE. Preferably, the PE polymer has a density from 0.930 to 0.970 g/cc, and a melt index (I2) from 0.2 to 5.0 g/10 min (2.16 kg @ 190° C.), preferably 0.3 to 2.5 g/10 min (2.16 kg @ 190° C.). Suitable resins can have a mono-modal or multi-modal molecular weight distribution.

In one embodiment, the polymer tape is formed from a PP (PP homopolymer). Wherein the PP polymer has a density from 0.90 to 0.92 g/cc, and a melt index (I2) from 1.0 to 8.0 g/10 min (2.16 kg @ 230° C.), preferably 2.0 to 5.0 g/10 min (2.16 kg @ 230° C.).

Preferably, the polymer tapes are monoaxially drawn to increase the breaking tenacity, whereas the total stretching ratio is set from 1.5 to 12.0, preferably from 2.0 to 7.0.

The above mentioned object is further solved in an embodiment of the invention, by a coated fabric, comprising a fabric from polymer tapes, wherein the fabric is coated with a sealing layer, wherein said sealant layer is formed from a Composition A comprising at least one ethylene/α-olefin interpolymer, and wherein the composition has a density from 0.905 to 0.930 g/cc, preferably from 0.910 to 0.930 g/cc (1 cc=1 cm3), and a melt index (I2) from 3 to 20 g/10 min.

In one embodiment, the Composition A has at least one melting temperature (Tm) from 115° C. to 135° C., preferably from 120° C. to 130° C., as determined by DSC.

In one embodiment, the at least one ethylene/α-olefin interpolymer is selected from the group consisting of the following:
  (i) a homogeneously branched ethylene/α-olefin interpolymer,
  (ii) a heterogeneous ethylene/α-olefin interpolymer, and
  (iii) combinations thereof.

In one embodiment, the at least one ethylene/α-olefin interpolymer is a combination of a homogeneously branched ethylene/α-olefin interpolymer, and (ii) a heterogeneous ethylene/α-olefin interpolymer. In a further embodiment, the α-olefin is selected from a C3-C10 α-olefin. In a further embodiment, the α-olefin is selected from propylene, 1-butene, 1-hexene, or 1-octene.

In one embodiment, Composition A has a melt index (I2) from 4 to 15, more preferably from 5 to 12 g/10 min (ASTM D-1238-04, condition 190° C./2.16 kg).

In one embodiment, Composition A has a Vicat temperature from 90° C. to 110° C., preferably from 95° C. to 105° C.

Composition A may comprise at least one additional ethylene polymer in the range 5 to 50 wt %, preferably 10 to 40 wt % of the total amount of Composition A. Such an ethylene polymer may be an ethylene homopolymer or ethylene copolymer with a density of 0.910 to 0.935 g/cm3 and a melt index (I2) of 0.2 to 10 g/10 min.

The sealant layer may comprise a combination of two or more embodiments as described herein.

Composition A may comprise a combination of two or more embodiments as described herein.

In some embodiments, in particular those with PE, HDPE or LLDPE the sealing layer can be attached directly onto the fabric. For some embodiments, e.g. those with polymer tapes consisting of PP, it is advantageous to include an adhesive layer which is arranged between the fabric and the sealing layer.

For the processability and a sufficient strength of the coated fabric, it has turned out to be advantageous if the polymer tapes have a thickness of between 20 μm and 80 μm. Furthermore, it is preferred that the sealing layer and optionally the adhesive layer, each have a thickness of between 5 μm and 60 μm.

In one embodiment, the adhesive layer is formed from a Composition B comprising at least one propylene-based polymer, preferably a propylene/ethylene interpolymer, more preferably a propylene/ethylene copolymer, and
  wherein the Composition B has a density from 0.860 to 0.930 g/cc, a melt flow rate (MFR) from 10 to 35 g/10 min.

In one embodiment, Composition B has a density from 0.865 to 0.925 g/cc, and more preferably from 0.870 to 0.920 g/cc.

In one embodiment, Composition B has a melt flow rate from 12 to 30 g/10 min, more preferably from 15 to 25 g/10 min (ASTM D-1238-04, condition 230° C./2.16 kg).

In one embodiment, Composition B has at least one melting point (Tm) from 90° C. to 120° C., preferably from 100° C. to 110° C., as determined by DSC.

In one embodiment, Composition B has a Vicat temperature from 50° C. to 115° C., preferably from 55° C. to 100° C., preferably from 60° C. to 95° C.

Composition B may comprise at least one additional ethylene polymer in the range 5 to 50 wt %, preferably 10 to 40 wt % of the total amount of Composition B. Such an ethylene polymer may be an ethylene homopolymer or ethylene copolymer with a density of 0.910 to 0.935 g/cm3 and a melt index (I2) of 0.2 to 10 g/10 min.

The adhesive layer may comprise a combination of two or more embodiments as described herein.

Ethylene-Based Polymers:

Suitable ethylene-base polymers for use in the coated fabrics of the invention include, but are not limited to, heterogeneously branched linear ethylene-based polymers, homogeneously branched linear ethylene-based polymers, and homogeneously branched substantially linear ethylene polymers (that is homogeneously branched long chain branched ethylene polymers), low density polyethylene (LDPE), or combinations thereof.

The heterogeneously branched linear ethylene interpolymers, homogeneously branched linear ethylene interpolymers, or homogeneously branched substantially linear ethylene interpolymers, typically have polymerized therein at least one α-olefin. The term "interpolymer" used herein indicates the polymer can be a copolymer, a terpolymer or any polymer having more than one polymerized monomer. Monomers usefully copolymerized with ethylene to make the interpolymer include the C3-C20 α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene. Preferred copolymers include EP (ethylene/propylene), EB (ethylene/butene), EH (ethylene/hexane) and EO (ethylene/octene) copolymers.

Typically the low density polyethylene (LDPE) is made under high-pressure, using free-radical polymerization conditions. Low density polyethylene is a homopolymer, and typically has a density from 0.91 to 0.94 g/cc, preferably from 0.90 to 0.93 g/cc.

Heterogeneously branched linear ethylene interpolymers include, but are not limited to, interpolymers of ethylene and one or more C3 to C8 α-olefins. Heterogeneously branched ethylene interpolymers can be prepared using Ziegler-Natta catalyst systems. Both the molecular weight distribution, and the short chain branching distribution, each arising from α-olefin (or comonomer) copolymerization, are relatively broad, compared to homogeneously branched linear and homogeneously branched substantially linear ethylene interpolymers. Heterogeneously branched linear ethylene interpolymers can be made in a solution, slurry, or gas phase process using a Ziegler-Natta catalyst. For example, see U.S. Pat. No. 4,339,507, which is fully incorporated herein by reference.

Heterogeneously branched linear ethylene-based interpolymers differ from the homogeneously branched ethylene-based interpolymers, primarily in their comonomer branching distribution. For example, heterogeneously branched interpolymers have a branching distribution, in which the polymer molecules do not have the same ethylene-to-comonomer ratio. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). These linear interpolymers lack long chain branching, or measurable amounts of long chain branching, as discussed above.

Heterogeneously branched ethylene-based interpolymers include, but are not limited to, linear medium density polyethylene (LMDPE), linear low density polyethylene (LLDPE), very low density polyethylene (VLDPE), and ultra low density polyethylene (ULDPE).

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same ethylene-to-comonomer ratio. The homogeneously branched ethylene interpolymers include linear ethylene interpolymers, and substantially linear ethylene interpolymers.

The homogeneously branched linear ethylene interpolymers are ethylene polymers, which lack long chain branching (or measurable amounts of long chain branching), but do have short chain branches, derived from the comonomer polymerized into the interpolymer, and which comonomer is homogeneously distributed, both within the same polymer chain, and between different polymer chains. That is, homogeneously branched linear ethylene interpolymers lack long chain branching, just as is the case for the linear low density polyethylene polymers or linear high density polyethylene polymers.

The homogeneously branched substantially linear ethylene interpolymers are described in U.S. Pat. Nos. 5,272,236; 5,278,272; 6,054,544; 6,335,410 and 6,723,810; the entire contents of each are herein incorporated by reference. The substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 carbons. The length of a long chain branch is longer than the carbon length of a short chain branch formed from the incorporation of one comonomer into the polymer backbone.

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE) made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The tape resins or coating resins may comprise one or more of the following additives: fillers, pigments, nucleating agents, slip or antibloc additives, UV stabilizers, high frequency or microwave sensitizers.

Propylene-Based Polymer:

The propylene-based polymers suitable for use in the coated substrates of the invention, include, but are not limited to, propylene/ethylene copolymers, propylene/ethylene/1-butene interpolymers, prop ylene/ethylene/ENB interpolymers, propylene/ethylene/1-hexene interpolymers, and propylene/ethylene/1-octene interpolymers. In a preferred embodiment, the propylene-based polymer is a propylene/ethylene interpolymer, and more preferably a propylene/ethylene copolymer.

Suitable propylene-based polymers include VERSIFY plastomers and elastomers (available from The Dow Chemical Company). Additional propylene-based polymers include VISTAMAXX polymers (ExxonMobil Chemical Co.), LICOCENE polymers (Clariant), EASTOFLEX polymers (Eastman Chemical Co.), REXTAC polymers (Hunstman), and VESTOPLAST polymers (Degussa). Other suitable polymers include ADSYL polymers, ADFLEX polymers, BORSOFT polymers, and various blends, such as blends of polypropylene homopolymers and propylene/α-olefin interpolymers.

DEFINITIONS

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and the term also includes polymers prepared from more than two different types of monomers.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term, "ethylene-based polymer," as used herein, refers to a polymer that comprises a majority amount of polymerized ethylene monomers (based on the weight of the polymer), and optionally, one or more polymerized comonomers.

The term, "ethylene/α-olefin interpolymer," as used herein, refers to a polymer that comprises a majority amount of polymerized ethylene monomers (based on the weight of the interpolymer), a polymerized α-olefin, and optionally, at least one other polymerized comonomer.

The term, "ethylene/α-olefin copolymer," as used herein, refers to a polymer that comprises a majority amount of polymerized ethylene monomers (based on the weight of the interpolymer), and a polymerized α-olefin, as the only monomer types.

The term, "propylene-based polymer," as used herein, refers to a polymer that comprises a majority amount of polymerized propylene monomers (based on the weight of the polymer), and optionally, one or more polymerized comonomers.

The term, "propylene/ethylene interpolymer," as used herein, refers to a polymer that comprises a majority amount of polymerized propylene monomers (based on the weight of the interpolymer), polymerized ethylene, and optionally, at least one other polymerized comonomer.

The term, "propylene/ethylene copolymer," as used herein, refers to a polymer that comprises a majority amount of polymerized propylene monomers (based on the weight of the interpolymer), and polymerized ethylene, as the only monomer types.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure, not specifically delineated or listed.

One aspect of the invention relates to a tubular bag body formed from a flat fabric bonded along the longitudinal edges to form a tube, wherein the bag body comprises coated fabric of the kind mentioned above.

Said sealing layer is preferably arranged at the inner walls of said tubular bag.

Preferably, sealing is performed in such a way that sealing lines or sealing seams are substantially at right angles to the direction of the warp tapes.

The above mentioned object of the present invention is further solved by a packaging machine and a method as described below.

A packaging machine according to the invention serves for filling gusseted bags wherein the walls of the bags consist of, at least in part, a woven fabric of polymer tapes and wherein at least at one end of the bag wall a filling mouth for filling is provided. A closing device is provided which is structured such that as the filling mouth is closed a welding temperature can be generated which is at least 50 Kelvin higher in the region of the gussets than in a center region of the bag wall.

The packaging machine according to the invention is very advantageous since it allows in a simple way to manufacture readily stackable bags of coated woven polymer tapes. The weld seams of the two bag ends are reliably stable including in the gusset region so as to allow an optically appealing and readily saleable shape of the bags. It has been surprisingly found that a considerable temperature increase is sufficient to durably close the four-layer gusseted regions. It is not required to apply a coating facilitating welding to the exterior surface of the tubular sheet of which the bag walls consist.

In the double-layer center area a considerably lower welding temperature is sufficient.

At this point reference is made to the fact that the bag in the sense of the present application is to be understood as an open bag or open-mouth bag. An open bag is understood to mean a bag that is filled at one of its ends over a major portion of its cross-section. After the bag has been filled through the filling end the bag opening is closed such that the open bag can subsequently be closed tight. The term open bag indicates the method of filling and does not refer in any way to the seal tightness of the open bag filled with a product.

Preferably the closing device is structured such that as the filling mouth is closed a welding temperature can be generated which is at least 50 Kelvin and in particular at least 60 Kelvin and preferably between 60 and 100 Kelvin higher in the region of the gussets than in a center region of the bag wall. Temperatures 70 to 90 Kelvin above that of the center area are particularly preferred. An optimum temperature increase depends on the woven bag material and its wall thickness.

Advantageously at least one sheet stockpile and at least one bag forming device are provided for manufacturing the bags from the tubular sheet of the sheet stockpile.

The closing device in particular includes at least one welding jaw that is broader than the width of the bag to be filled.

The welding jaw or at least one of the welding jaws may comprise at least one welding strip and in particular an electrical resistance welding strip and it may for example operate in pulsed mode.

The cross-sectional profile of the welding strip of the welding jaw may be adapted to the desired temperature profile over the width of the welding jaw and also over the bag width such that a cross-section in the gusseted region may be considerably smaller than in a center area.

The welding strip of the welding jaw may in particular comprise different coatings in different regions over the width of the welding strip. This allows realizing different temperatures in a resistance welding strip since additional coating will increase the conductive cross-section. Highly conductive, thick coatings considerably decrease the local temperature while weakly conductive or thinner coatings decrease the local temperature less.

Preferably the welding jaw protrudes beyond the width of the bag to be sealed and the welding strip is provided with a highly conductive coating in the end regions to decrease the electrical resistance and the prevailing temperature in these regions.

In the gusset regions the welding strip may comprise no or a weakly conductive coating since this is where the maximum temperature is required to ensure reliable welding of all of the four layers of the tubular sheet.

When the tubular sheet is manufactured from a flat-lying sheet or a flat-lying woven sheet, then the flat-lying sheet is folded over at its lateral edges and the overlapping area is welded. In this overlapping area three layers are present which are provided with a correspondingly thinner or more weakly conductive coating.

The center area is provided with two layers only and thus requires a relatively low welding temperature. The center area may be provided with a medium conductive coating.

The method according to the invention serves for filling gusseted bags wherein the walls of the bags consist of polymer tapes at least in part and wherein at least one end of the bag wall a filling mouth for filling is provided. For closing the filling mouth after filling, a welding temperature is generated which is at least 50 Kelvin higher in the gusseted areas than in a center area of the bag wall.

The bags are in particular formed from a tubular sheet off a sheet stockpile.

The invention is now illustrated in further detail on the basis of non-limiting exemplary embodiments, with reference to the drawings.

In the drawings:

FIG. 5a, 5b show a tubular bag body in cross-section (FIG. 5a) and in top-view (FIG. 5b) according to the invention;

FIG. 6 shows a schematic side view of a packaging machine according to the invention;

Figure 1:
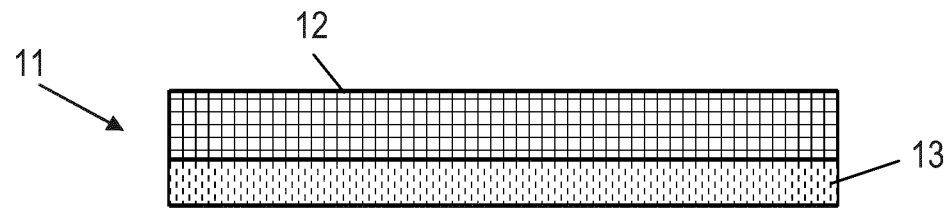
FIG. 1 shows a first embodiment of a coated fabric according to the invention in cross-section.

In FIG. 1, a first embodiment of a coated fabric 11 according to the invention is illustrated in cross-section. Said coated fabric 11 comprises a schematically shown fabric 12. Fabric 12 comprises polymer tapes 12a, 12b. The polymer tapes 12a, 12b illustrated by way of example form the weft 12b and warp 12a of the fabric 12 are shown in more detail in FIG. 3. The tape fabric 12 is coated with a sealing layer 13 from a thermoplastic synthetic material. Preferably the melting point of said sealing layer 13 is below the crystallite melting point of the fabric tape material.

Figure 2:
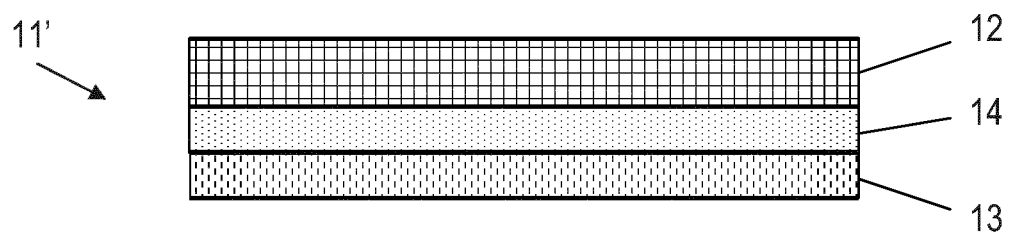
FIG. 2 shows a second embodiment of a coated fabric according to the invention in cross-section.

In FIG. 2, a second embodiment of a coated fabric 11' according to the invention is illustrated, which likewise comprises a fabric 12 from polymer tapes 12a, 12b as well as a sealing layer 13 from a thermoplastic synthetic material the melting point of which is below the crystallite melting point of the fabric tape material. The present embodiment of the coated fabric 11' differs from the above first embodiment only in that an additional adhesive layer 14 is arranged between the fabric and the sealing layer 13.

Figure 3:
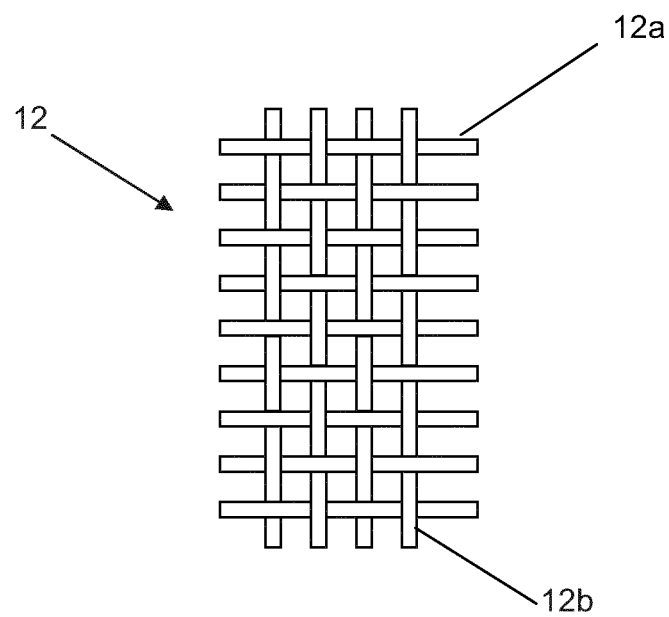
FIG. 3 shows a schematic illustration of a section of a fabric in top view.

In FIG. 3 a schematic representation of a section of a fabric 12 is shown. The fabric 12 consists of tapes 12a, 12b, namely weft tapes 12b and warp tapes 12a. According to the invention at least a portion of the tapes 12a, 12b, preferably of the warp tapes 12a, has a breaking tenacity of less than 45 cN/tex, preferably 15 to 40 cN/tex and an elongation at break of more than 30%, preferably of 40 to 90%. In a more preferred embodiment all of the warp tapes 12a have a breaking tenacity of less than 45 cN/tex, preferably 15 to 40 cN/tex and an elongation at break of more than 30%, preferably of 40 to 90%, whereas the weft tapes 12b have a different breaking tenacity and/or elongation at break.

Coming back to FIG. 1, the weft tapes 12b may consist of polypropylene which typically has a crystallite melting point of above 160° C. The polymer tapes 12a, 12b may be monoaxially drawn. In a first variant, the sealing layer 13 comprises LD-PE the melting point of which is approx. 105° C. Other suitable polymer compositions are described as composition A above and will be described in more detail below. Polyethylene has the disadvantage that it adheres poorly to polypropylene. Therefore, polymers which exhibit a low melting point and adhere properly to polypropylene are also suitable as an alternative to polyethylene as a sealing layer 13. The advantage of using a sealing layer with a lower melting point than the polymer tapes 12a, 12b has the advantage that the orientation of the molecules in the monoaxially drawn tapes 12a, 12b is not destroyed by the sealing process. By heating the polymer tapes 12a, 12b up to the crystallite melting point the orientation of the molecules in the monoaxially drawn tapes 12a, 12b may be destroyed.

Coming back to FIG. 2, a possibility of eliminating the drawback of poor adhesion between PE and PP as described with reference to FIG. 1 is the introduction of the adhesive layer 14. The adhesive layer may consist of a composition B as described above and will be described in more detail below.

In an alternative embodiment the polymer tapes 12a, 12b may also have other properties with respect to breaking tenacity and enlongation at break. In this case it is important to use a sealing layer 13 with the composition A as described above and in further detail below.

The coated fabrics 11, 11' according to the invention are suitable for interconnecting by welding, wherein the welded joint produced exhibits high strength. Thus, they are particularly well suited for use in the production of bags, in particular for the form, fill and seal (FFS) process. They are also very well suited for ultrasonic welding, heated tool welding, infrared welding or laser beam welding. High frequency welding or microwave welding are alternative suitable welding techniques, but may require addition of high frequency or microwave sensitive additives (e.g. metal particles, graphite, carbon or others) and or polar polymers to the polyethylene or propylene sealing layer since these polyolefin resins are normally insensitive to high frequency energy. Preferably using one of these welding processes, welding is performed so that the welding line or welding seam is substantially rectangular to the warp tapes 12a. With reference to FIG. 3 the welding seams then would be vertical.

Such polymer tapes 12a, 12b according to the invention are advantageously made of thermoplastic polymer material. They may be monoaxially drawn polymers. According to a first example the polymer tapes are made of HDPE (T4). A breaking tenacity of 38.6 cN/tex, with an elongation at break of 56.7% has been reached. In this case the sealing layer consisted of Composition A. An expensive adhesive layer could be omitted as HDPE and the sealing layer showed good adhesion. Also the energy dissipation is higher compared to PP tapes fabrics. In a second example PP tapes with similar mechanical properties were used (T3). A breaking tenacity of 36 cN/tex, with an elongation at break of 40.9% has been reached. However, an additional adhesive layer, as described by Composition B between the sealing layer and woven materials was needed.

Figure 4:
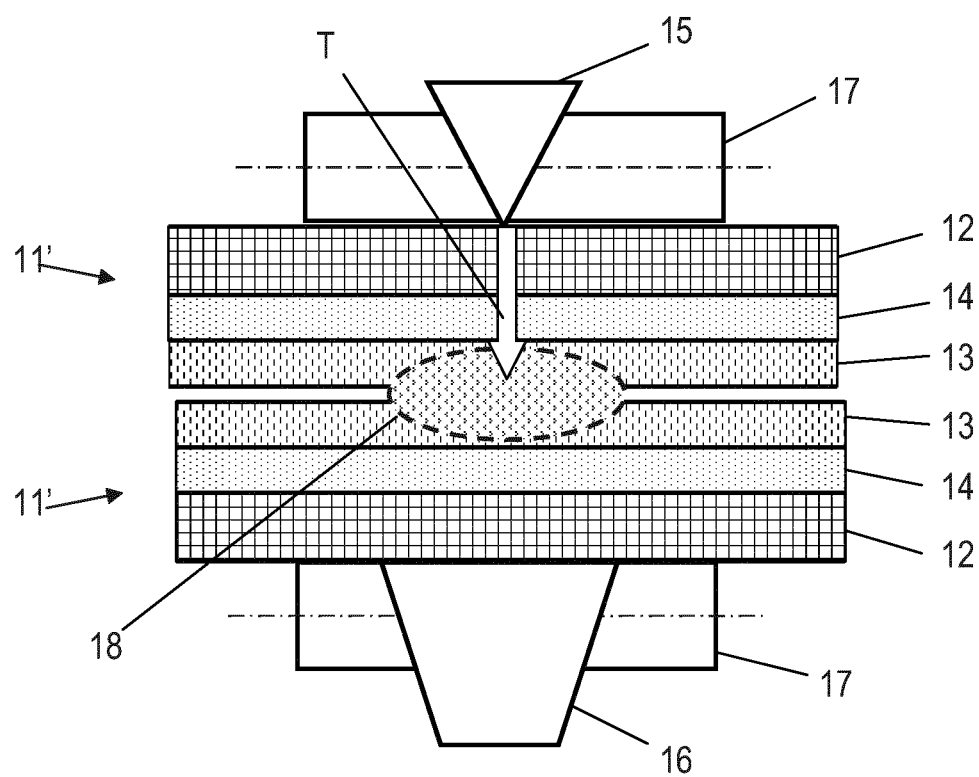
FIG. 4 shows a schematic illustration of a welding process according to the invention on two coated fabrics according to the invention.

On the basis of FIG. 4, the interwelding of two of the coated fabrics 11' depicted in FIG. 2 is now illustrated schematically. At first, the two coated fabrics 11', 11' are placed on top of each other such that their sealing layers 13, 13 face each other. Then, at least one of the coated fabrics 11', 11' is heated from the side of the fabric 12 from monoaxially drawn polymer tapes, i.e., from outside, to a temperature (arrow T) which is below the crystallite melting temperature of the fabric tape material, using at least one welding element 15, 16. The supply of heat occurs until the sealing layers 13 are caused to melt and, in doing so, tightly bond to each other, as indicated by the area 18 with a dashed line. The application of pressure occurs directly via the welding elements 15, 16. If the welding process is configured as ultrasonic welding, the welding element 15 is designed as an ultrasonic actuator and the welding element 16 as a counterpart is shaped in the form of an anvil. If the welding process is configured as heated tool welding, the welding element 15 is designed as a heating element, and the welding element 16 is designed either also as a heating element or as a bearing. If the welding process is configured as infrared or laser beam welding, the welding element 15 is designed as an infrared radiator or a laser beam source.

FIG. 5a and FIG. 5b show a tubular bag body 1 formed from a flat fabric 12 bonded along its longitudinal edges 9a, 9b to form a tube. The tube is folded several times so to form an essentially rectangular body upon filling. The bag body comprises coated fabrics 12. As can be seen from FIG. 5b the tubular bag body comprises a sealing seam or weld which is substantially rectangular to the length of the tubular body (and to the warp tapes 12a of the fabric).

The packaging machine 100 illustrated in FIG. 6 in a schematic cross-section serves for filling bags 200 with products 208. This product may for example be bulk material, powdery products or loose fill material with particles. Or else it is conceivable to fill the bags 200 with other products 201 such as liquid or paste-like products.

The packaging machine 100 is configured as an FFS packaging machine and comprises a sheet stockpile 101 having at least one sheet roll. The sheet stockpile 101 contains rolled up tubular sheet 102 used for manufacturing the bags 200. The providing of a sheet stockpile 101 with one or more sheet rolls allows to manufacture bags 200 as needed. The length of the bags is in particular flexibly variable and can readily be adapted to the desired filled quantity.

Figure 8:
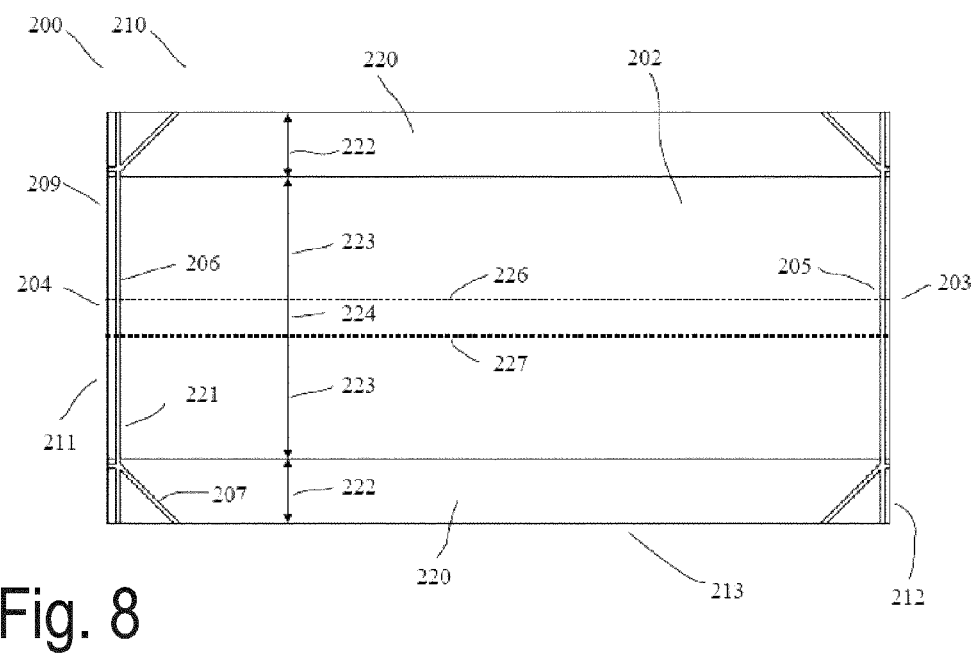
FIG. 8 shows a bag manufactured by means of the packaging machine according to FIG. 6.

The tubular bag body or sheet 102 fed off the sheet roll of the sheet stockpile 101 is conveyed via the sheet storage 103 into the interior of the packaging machine 100 and further to the corner welding device 104. In the corner welding device 104 the corners are welded as they are shown in FIG. 8 as corner weld seams 207.

These corner weld seams or corner welds 207 achieve a brick-shaped form of the filled bag so as to achieve simple and optically appealing stackability. This facilitates transport, handling, and sales.

When the corner weld seams 207 have been manufactured the tubular sheet 102 with the corner weld seams 207 produced in the gussets 220 proceeds to the bag length adjuster 106 which serves to equalize the indexed operation of the packaging machine 100. The bag length adjuster 106 allows steady unwinding of the sheet stockpile 101 from the sheet roll while the packaging machine performs in its interior an indexed operation for forming and filling and subsequently sealing the bags 200.

The sheet drive 107 serves to convey the tubular sheet 102. The tubular sheet 102 is fed to the welding device 112 where first the tubular sheet 102 is clamped by means of the clamping device 105 before (see FIG. 7) the welding jaws 108 make a weld seam in the tubular sheet 102.

The welding device 112 with the welding strips 128 of the welding jaws 108 simultaneously welds the center region and the gusseted regions although with considerably different welding temperatures. Firstly the bag bottom with the closing seam 205 is formed. The closing seam 205 extends across the entire traverse width 212 of the bag 200.

Figure 7:
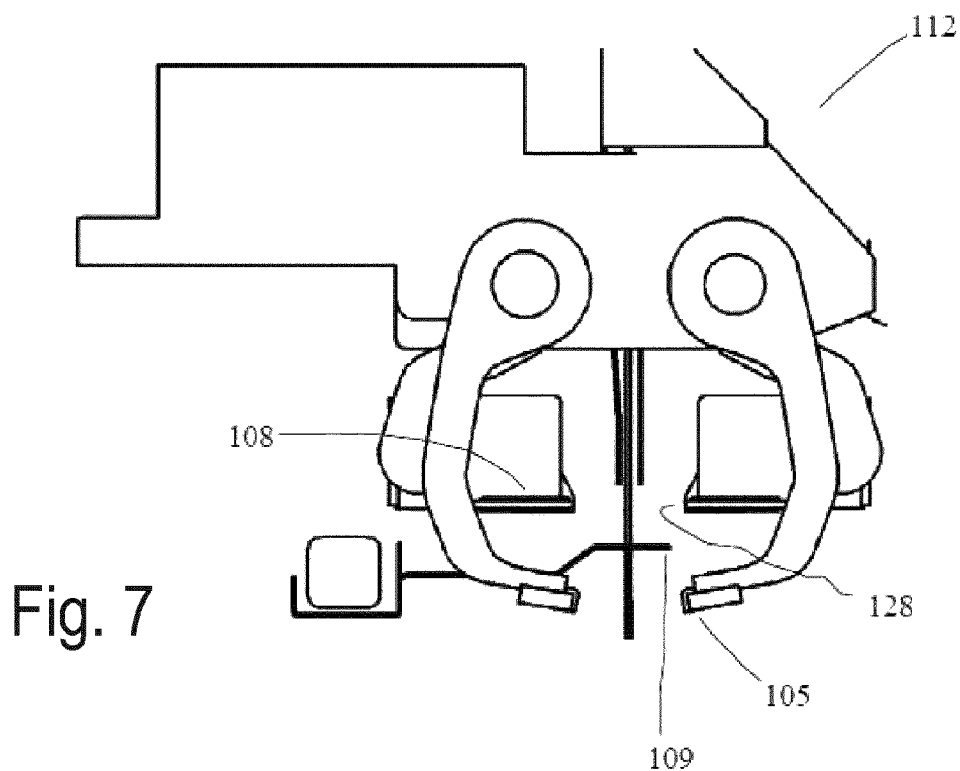
FIG. 7 shows the welding device of the packing machine according to FIG. 6.

As FIG. 7 shows enlarged, a cutting blade 109 is provided which after making the closing seam 205 at the bag bottom 215 and advancing the tubular material severs the tubular sheet 102 in the region of the second end 204 of the bag formed. The bag 200 configured as an open bag 210 now comprises a bag bottom 215 and at its upper end is provided with a filling mouth 211 at the bag opening 209. The filling mouth does not extend over the entire width of the bag 200 since the region of the gussets 220 is left out by way of the corner weld seams.

Thereafter the closing seam 205 at the bag bottom 215 may be cooled down by means of a cooling device 113 to achieve adequate stability with a high throughput.

By means of a swing conveyor 115 the bag 200 is conveyed further by means of the pivotal swing arms 116 and opened by means of a bag opener 110. At the next cycle the bag 200 is attached to the filling spout 123 with its filling mouth 211 and filled with the product 208 from the product feed 124.

After the filling operation the bag 200 is fed via the swing conveyor 115 to the closing device 125 which in turn comprises a clamping device 105 and welding jaws 108 with welding strips 128.

At the closing device 125 the second end 204 of the bag 200 is closed by way of a closing seam 206 as a head seam. The gusset 220 region is again welded shut at a significantly increased temperature.

FIG. 8 illustrates an open side gusseted bag 210 as a bag 200 comprising closing seams 205 and 206 at each of its first 203 and second ends 204.

Both the closing seams 205 and 206 configured as welded seams 221 extend across the entire bag 200 width, allowing the bag interior to be sealed tight.

The bag 200 has been filled at its second end 204 through the filling mouth 211 of the bag opening 209. The filling mouth extends over nearly the entire bag width. The region of the corner weld seams 207 is separated and does not form part of the filling mouth 211.

The bag comprises four layers at the gussets 220 in the gusset region 222 while only two layers need to be welded in the center area 223. The overlapping region 224 with three layers may be provided in case that the tubular sheet 102 is manufactured from a flat sheet or a cut-open tubular sheet is manufactured and the edges 226 and 227 overlap in the joining region.

Figure 9:
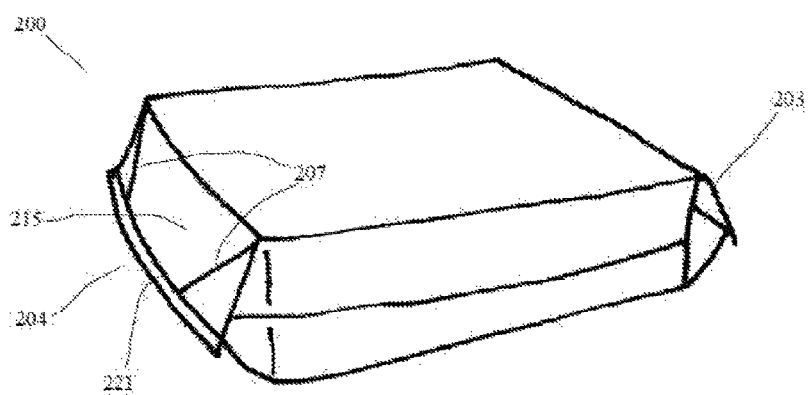
FIG. 9 shows a schematic and perspective view of a filled bag.

FIG. 9 shows a schematic and perspective view of the filled bag having a brick-shaped and readily stackable form.

Figure 10:
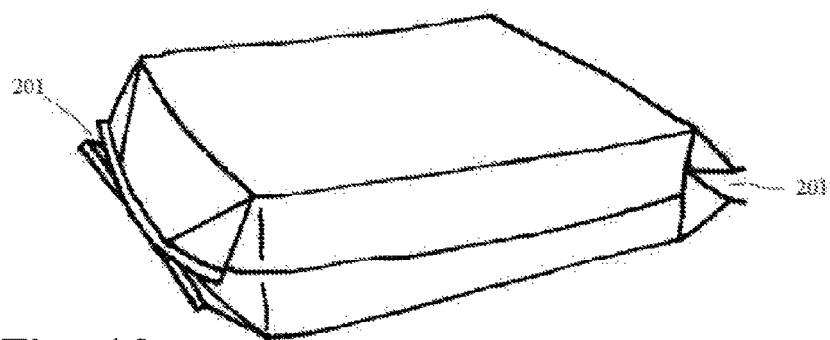
FIG. 10 shows a schematic and perspective view of a filled bag.

FIG. 10 illustrates a conventional bag in which the weld seam in the gussets had not been strong enough such that the areas 201 have come undone while the bag is still sealed tight. The invention remedies this effect.

Figure 11:
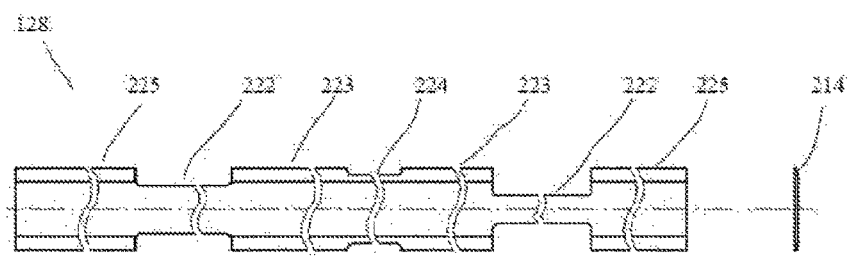
FIG. 11 shows a profile of a welding strip of a welding jaw for the welding device according to FIG. 7.
Figure 12:
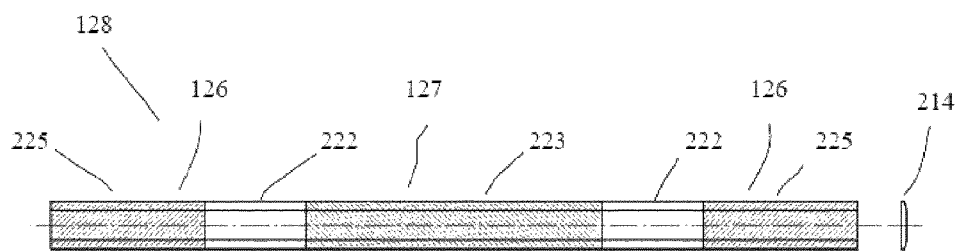
FIG. 12 shows a coated welding strip for the welding device according to FIG. 7.

The FIGS. 11 and 12 illustrate two different welding strips 128 for the welding jaws 108 for the packaging machine 100.

The welding strip 128 illustrated in FIG. 11 has a distinct cross-sectional profile 214. The welding strip 128 is configured as an electrical resistance welding strip such that the local temperature is dependent on the local electrical resistance of the welding strip 128.

In regions where a high temperature is required the cross-section is small. In regions where no high temperature is required or necessary a larger cross-section is provided. This is why the cross-section is particularly high in the end region 225 since it extends beyond the bag width and no welding occurs in this area. The cross-section selected is particularly low in the gusset regions 222 and in the center area 223, comparatively, large. In this way the welding temperature achieved in the gusset region 222 is 60 to 100 Kelvin and presently 80 Kelvin higher and results in secure sealing of the head seam including in the region of the gussets. Areas 201 coming undone at the gussets can be avoided so as to achieve good stackability. The cross-section selected is somewhat lower in the overlapping region 224 to obtain secure welding of the three layers present there.

In FIG. 12 another embodiment is illustrated in which the locally different conductivity and thus temperature during welding is achieved by locally different coatings. A combination of a cross-sectional profile with local coatings is conceivable as well.

The coating 126 selected in the end regions 225 is particularly highly conductive. In the gusset regions 222 no coating at all or coating having very low conductivity is applied. A medium conductive coating 127 is provided in the center area 223. In the gusset region 222 in turn the welding temperature achieved is increased by 60 to 100 Kelvin and presently approximately 70 to 90 Kelvin so as to securely interconnect the regions of the gussets 220. In an optionally provided overlapping region 224 a slightly less conductive coating is selected to generate a correspondingly higher welding temperature.

EXPERIMENTAL

Four different tapes for the woven webs have been produced on a Starlinger tape line starEX 1500ES/E120T according to the specification listed in TABLE 1.

TABLE 1

Tape specification

| Tape ID | Tape polymer | Grade | Tape width mm | Linear density tex | Tenacity cN/tex | Elongation at break % |
|---|---|---|---|---|---|---|
| T1 | PP | Chempetrol Mosten TB 003 | 3.01 | 101.5 | 48.6 | 28.38 |
| T2 | PP | Chempetrol Mosten TB 003 | 3.01 | 102.5 | 47.1 | 28.86 |
| T3 | PP | Chempetrol Mosten TB 003 | 3.03 | 102.7 | 36 | 40.88 |
| T4 | HDPE | Borealis VL 5580 | 2.96 | 102.9 | 38.6 | 56.72 |
| T5 | LLDPE | Huntsman Rexell M3105 | 2.27 | 207.6 | 22.0 | 78.75 |

From these tapes four different webs have been prepared on Starlinger alpha 61 looms. These machines produce a tubular fabric and then slit the tube into two flat webs by means of an ultrasonic cutting and sealing device. The composition of each fabric is described in TABLE 2.

TABLE 2

Fabric specification

| Fabric ID | Fabric polymer | Grade | Weft tape ID | Warp tape ID | Fabric weight g/m² |
|---|---|---|---|---|---|
| PP1 | PP | Chempetrol Mosten TB 003 | T1 | T1 | 67.62 |
| PP2 | PP | Chempetrol Mosten TB 003 | T3 | T3 | 68.52 |
| PP3 | PP | Chempetrol Mosten TB 003 | T2 | T3 | 67.21 |
| HD1 | HDPE | Borealis VL 5580 | T4 | T4 | 71.99 |

The extrusion coating of these selected webs has been done on a Starlinger stacoTEC 1500COEX extrusion coating line with two extruders. The webs have been preheated before they have been extrusion coated with selected polymer compositions described in TABLE 3 and TABLE 4. TABLE 5 shows the performance of the produced substrates.

TABLE 3

Compositions for Extrusion Coating

| Composition | Density (g/cc) | MFR (g/10 min, 2.16 kg) at 230° | Tm (° C.) | Vicat (° C.) | Type |
|---|---|---|---|---|---|
| (ExCo PP)* | 0.885 | 20 (230° C.) | 108 | 66 | Propylene/ethylene copolymer |

| Composition | Density (g/cc) | MFI (g/10 min, 2.16 kg) | Tm (° C.) | Vicat (° C.) | Type |
|---|---|---|---|---|---|
| (ExCo PE1)** | 0.911 | 7.0 (190° C.) | 124 | 102 | Ethylene/Octene Copolymer Blend |
| (ExCo PE2)*** | 0.919 | 8.0 (190° C.) | 124 | 102 | Ethylene/Octene Copolymer Blend |

*DP 5000.01, Developmental Plastomer, available from The Dow Chemical Company
**ELITE 5800 Enhanced Polyethylene Resin, available from The Dow Chemical Company
***ELITE 5811 Enhanced Polyethylene Resin, available from The Dow Chemical Company

TABLE 4

Coated Fabrics

| Coated Fabric (11) ID* | Composition Layer (13) | Nominal Coating Weight (13) (g/m2) | Composition Layer (14) | Nominal Coating Weight (14) (g/m2) | Fabric (12) ID | Coated Fabric Weight (g/m2) |
|---|---|---|---|---|---|---|
| V126b | (ExCo PE2) | 35 | (ExCo PP) | 5 | PP 1 | 106.9 |
| V130 | (ExCo PE2) | 35 | (ExCo PP) | 5 | PP 2 | 109.2 |
| V131 | (ExCo PE2) | 35 | (ExCo PP) | 5 | PP 3 | 107.8 |
| V132 | (ExCo PE2) | 40 | no | no | HD 1 | 112.8 |
| V133 | (ExCo PE1) | 40 | no | no | HD 1 | 113.7 |

TABLE 5

Performance of the Coated Fabrics listed in Table 4

| Coated Fabric (11) ID* | Elongation at Break % MD % | Elongation at Break % CD % | Seal Strength (Fabric) (Heat Sealing) 130° C. N/15 mm | Max Seal Strength (Seal) (Impulse Sealing) N/50 mm | Elongation at Break (Impulse Sealing) % | Bag Drop Test-gusseted side (height) meters | Bag Drop Test-flat side (height) meters | Bag Drop Test-sealing side (height) meters |
|---|---|---|---|---|---|---|---|---|
| V126b | 22.4 | 25.58 | 20.8 | 164 | NA* | 0.6 | 2 | 2 |
| V130 | 30.4 | 30.32 | 16.5 | 140 | 22 | 0.5 | 2 | 2 |
| V132 | 32.8 | 34.29 | 65.4 | 207 | 19 | 0.9 | 2 | 2 |
| V133 | 33.4 | 33.97 | 58.4 | 192 | 21 | 1.1 | 2 | 2 |

NA = not available.

Test conditions for Max Seal Strength (Impulse Sealing) and Elongation at Break:
Machine: Zwick/Roell "Zwicki—line 2.5"
Clamp distance: 150 mm
Test velocity: 100 mm/min
Sample width: 50 mm
For each adjustment we tested three samples.
The test is in accordance with ASTM D882 with the mentioned changes due to the special requirements of the fabric.

The coated fabrics listed in Table 4 were heat sealed. For each coated fabric the layer 13 was sealed to itself. All samples were sealed using a KOPP Sealer, according to ASTM F2099. After contacting the layer 13 to layer 13, as described in FIG. 4, heat was applied from fabric 12. Heat seal strength was determine by preparing seal samples at different temperatures, all samples were conditioned for 48 hour under ambient conditions before testing. Seal condition was as follows: One second contact time with 500N force, both sealing bars heated to the specified temperature (each seal bar is TEFLON coated; width=5 mm for a bond area of "5 mm×15 mm" in center of sample). Sample size used to determine seal strength was "100 mm length×15 mm width."

Figure 13:
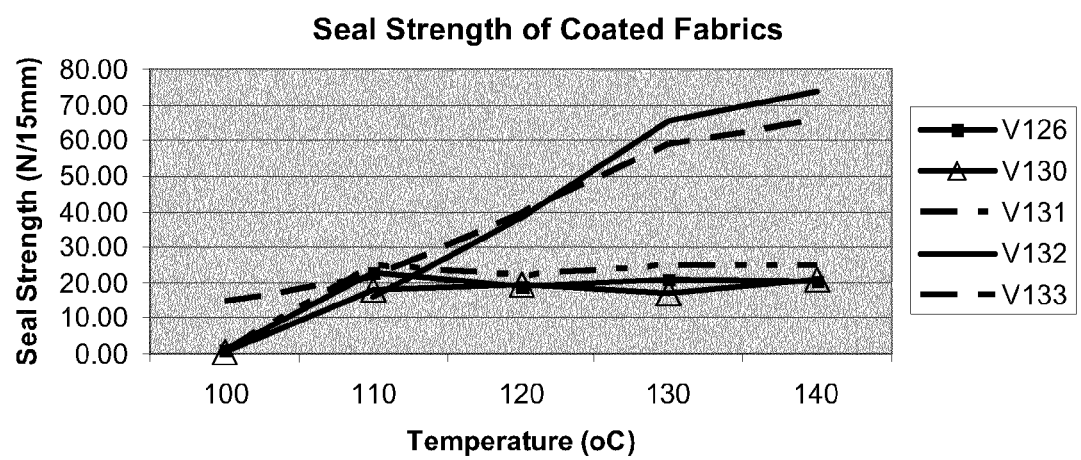
FIG. 13 shows the seal strength versus sealing temperature of the coated fabrics.

Seal strength of each coated substrate was determined using an INSTRON 5564 tensile tester, with a clamp distance of 30 mm, and a cross head speed of 100 mm/min. For each temperature, at least five samples (seals) were tested in cross direction and the average seal strength was reported. The seal performance of each coated substrate is shown in FIG. 13. For sealing temperatures greater than 130° C., the web started to shrink when sealed.

Elongation at Break of coated fabrics was determined according to ASTM D-882.

The densities of the ethylene-based polymers and propylene-based polymers, and blends thereof, are measured in accordance with ASTM D-792-08.

Melt indexes (I2) of ethylene-based polymers, and blends thereof, are measured in accordance with ASTM D-1238-04, condition 190° C./2.16 kg. The melt flow rates (MFR) of propylene-based polymers, and blends thereof, are measured in accordance with ASTM D-1238-04, condition 230° C./2.16 kg.

The melting point (Tm) for ethylene-based and propylene-based polymers, and blends thereof, can be determined by Differential Scanning calorimetry (DSC) using a TA Instruments Model Q1000 Differential Scanning calorimeter. A sample of around "5 to 8 mg" size is cut from the material to be tested, and placed directly in the DSC pan for analysis. The sample is first heated, at a rate of about 10° C./min, to 180° C. for ethylene-based polymers (230° C. for propylene-based polymers), and held isothermally for three minutes at that temperature, to ensure complete melting (the first heat). Then the sample is cooled at a rate of 10° C. per minute to −60° C. for ethylene-based polymers (−40° C. for propylene-based polymers), and held there isothermally for three minutes, after which, it is again heated (the second heat) at a rate of 10° C. per minute, until complete melting. The thermogram from this second heat is referred to as the "second heat curve." Thermograms are plotted as "watts/gram versus temperature."

The melting point(s) (Tm) of the polymers can be determined from the second heat curve obtained from DSC, as described above. The crystallization temperature (Tc) can be determined from the first cooling curve.

Vicat softening temperatures, or Vicat temperatures, are measured in accordance with ASTM D1525-07. The term "softening temperature," as used herein, refers to the Vicat softening temperature.

| List of reference numerals: | |
|---|---|
| 1 | tubular bag body |
| 9a, 9b | longitudinal edges |
| 10 | bag |
| 11 | coated fabric |
| 12 | fabric |
| 12a | warp tapes |
| 12b | weft tapes |
| 13 | sealing layer |
| 15, 16 | welding element |
| 100 | packaging machine |
| 101 | sheet stockpile/sheet roll |
| 102 | tubular sheet |
| 103 | sheet storage |
| 104 | corner welding device |
| 105 | clamping device |
| 106 | bag length adjuster |
| 107 | sheet drive |
| 108 | welding jaw |
| 109 | cutting blade |
| 110 | bag opener |
| 112 | welding device |
| 113 | cooling device |
| 114 | bag forming device |
| 115 | swing conveyor |
| 116 | swing arm |
| 117 | welding jaw |
| 118 | clamping device |
| 119 | sheet gripper |
| 120 | swing rod |
| 121 | discharging belt |
| 122 | scissors table |
| 123 | filling spout |
| 124 | product feed |
| 125 | closing device |
| 126 | coating |
| 127 | coating |
| 128 | welding strip |
| 200 | bag |
| 201 | region |
| 202 | bag wall |
| 203 | first end |
| 204 | second end |
| 205 | closing seam |
| 206 | closing seam |
| 207 | corner weld seam |
| 208 | product |
| 209 | bag opening |
| 210 | open bag/open-mouth bag |
| 211 | filling mouth |
| 212 | traverse width |
| 213 | longitudinal side |
| 214 | cross-sectional profile |
| 215 | bag bottom |
| 220 | gusset |
| 221 | weld seam |
| 222 | gusset region |
| 223 | center area |

The invention claimed is:

1. A coated fabric comprising:
a first coated fabric welded with a second coated fabric,
wherein the first coated fabric and the second coated fabric comprise fabrics formed from polymer tapes,
wherein the first coated fabric and the second coated fabric are coated with a sealing layer,
wherein the first coated fabric and the second coated fabric are welded together along the sealing layer,
wherein the sealing layer is formed from a composition A comprising a combination of (i) a homogeneously branched ethylene/α-olefin interpolymer and (ii) a heterogeneous ethylene/α-olefin interpolymer, and wherein the composition A has a density from 0.905 to 0.930 g/cc (1 cc=1 cm$^3$) and a melt index (I2) from 3 to 20 g/10 min (ASTM D-1238-04, condition 190° C./2.16 kg),
wherein a seal formed where the first and second layer are welded together has a seal strength of at least 16.5 N/15 mm (11 N/cm) (determined using an INSTRON 5564 tensile tester, with a clamp distance of 30 mm, and a cross head speed of 100 mm/min).

2. A coated fabric according to claim 1, wherein the α-olefin is selected from a C3-C10 α-olefin.

3. A coated fabric according to claim 2, wherein the α-olefin is selected from propylene, 1-butene, 1-hexene, or 1-octene.

4. A coated fabric according to claim 1, wherein the composition A has a melt index (I2) from 4 to 15 g/10 min (ASTM D-1238-04, condition 190° C./2.16 kg).

5. A coated fabric according to claim 1, further comprising an adhesive layer, which is formed from a composition B comprising at least one of a propylene-based polymer, a propylene/ethylene interpolymer, or a propylene/ethylene copolymer.

6. A coated fabric according to claim 5, wherein the composition B has a density from 0.860 to 0.930 g/cc and a melt flow rate (MFR) from 10 to 35 g/10 min (ASTM D-1238-04, condition 230° C./2.16 kg).

7. A coated fabric according to claim 5, wherein the composition B has a density from 0.865 to 0.925 g/cc.

8. A coated fabric according to claim 5, wherein the composition B has a melt flow rate from 12 to 30 g/10 min (ASTM D-1238-04, condition 230° C./2.16 kg).

9. A coated fabric according to claim 5, wherein composition B has at least one melting point (Tm) from 90° C. to 120° C. as determined by DSC.

10. A coated fabric according to claim 5, wherein the adhesive layer comprises at least one additional ethylene-based polymer.

11. A coated fabric according to claim 10, wherein the at least one additional ethylene-based polymer is an ethylene homopolymer with a density of 0.910 to 0.935 g/cc.

12. A coated fabric according to claim 1, wherein at least a part of the polymer tapes have a breaking tenacity of less than 45 cN/tex and an elongation at break of more than 30%.

13. A coated fabric according to claim 12, wherein the fabric contains warp tapes and weft tapes, wherein said warp tapes have said breaking tenacity of less than 45 cN/tex, and said elongation at break of more than 30%.

14. A coated fabric according to claim 13, wherein at least a part of the weft tapes have a breaking tenacity and/or an elongation at break different from said warp yarns.

15. A coated fabric according to claim 12, wherein said polymer tapes comprise PP, PE, HDPE, LLDPE, or combinations thereof.

16. A tubular bag body formed from a flat fabric bonded along its longitudinal edges to form a tube, wherein the bag body comprises a coated fabric according to claim 1, wherein the sealing layer is on the inside of the tube.

17. A bag comprising a tubular bag body formed from a flat fabric bonded along the longitudinal edges to form a tube, wherein the bag body comprises a coated fabric according to claim 1.

18. A bag comprising a coated fabric according to claim 1.

19. A coated fabric according to claim 1, wherein the composition A has a density from 0.910 to 0.930 g/cc.

20. A coated fabric according to claim 5, wherein the composition B has a melt flow rate from 15 to 25 g/10 min (ASTM D-1238-04, condition 230° C./2.16 kg).

21. A coated fabric, comprising:
a fabric formed from polymer tapes,
wherein the fabric is coated with a sealing layer, the sealing layer being formed from a composition comprising:
at least one ethylene/α-olefin interpolymer, comprising a combination of:
a homogenously branched ethylene/α-olefin interpolymer; and
a heterogeneous ethylene/α-olefin interpolymer,
wherein the composition comprises a density from 0.905 to 0.930 g/cc (1 cc=1 cm$^3$); and
wherein the composition comprises a melt index (I2) from 3 to 20 g/10 min (ASTM D-1238-04, condition 190° C./2.16 kg), and wherein the composition has at least one melting temperature (Tm) from 115° C. to 135° C. as determined by DSC, and
wherein the coated fabric is welded with a second fabric at the sealing layer.

22. A coated fabric according to claim 1, wherein the composition A has at least one melting temperature (Tm) from 115° C. to 135° C. as determined by DSC.

23. A coated fabric according to claim 1, wherein the seal has a max seal strength (impulse sealing) of at least 140 N/50 mm (determined according to ASTM D882, with clamp distance 150 mm, test velocity 100 mm/min, and sample width 50 mm).

24. A coated fabric material, comprising:
a first section of coated fabric and a second section of coated fabric each formed from polymer tapes,
wherein each of the first section of coated fabric and second section of coated fabric includes a sealing layer formed from a composition comprising:
at least one ethylene/α-olefin interpolymer comprising a combination of a homogenously branched ethylene/α-olefin interpolymer and a heterogeneous ethylene/α-olefin interpolymer,
wherein the composition comprises a density from 0.905 to 0.930 g/cc (1 cc=1 cm$^3$), and
wherein the composition comprises a melt index (I2) from 3 to 20 g/10 min (ASTM D-1238-04, condition 190° C./2.16 kg);
wherein the first section of coated fabric and the second section of coated fabric are welded to one another along their sealing layers to form a seal, wherein the seal has a seal strength of at least 16.5 N/15 mm (11 N/cm) (determined using an INSTRON 5564 tensile tester, with a clamp distance of 30 mm, and a cross head speed of 100 mm/min).

* * * * *